(12) United States Patent
Morse et al.

(10) Patent No.: US 7,186,352 B2
(45) Date of Patent: Mar. 6, 2007

(54) MICROFLUIDIC SYSTEMS WITH EMBEDDED MATERIALS AND STRUCTURES AND METHOD THEREOF

(75) Inventors: Jeffrey D. Morse, Martinez, CA (US); Klint A Rose, Boston, MA (US); Mariam Maghribi, Livermore, CA (US); William Benett, Livermore, CA (US); Peter Krulevitch, Pleasanton, CA (US); Julie Hamilton, Tracy, CA (US); Robert T. Graff, Modesto, CA (US); Alan Jankowski, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 178 days.

(21) Appl. No.: 10/853,859

(22) Filed: May 25, 2004

(65) Prior Publication Data

US 2004/0211054 A1 Oct. 28, 2004

Related U.S. Application Data

(62) Division of application No. 10/131,846, filed on Apr. 24, 2002, now Pat. No. 6,921,603.

(51) Int. Cl.
 *H01M 8/00* (2006.01)
(52) U.S. Cl. .................... 216/67; 29/623.4; 156/89.12
(58) Field of Classification Search .................... None
 See application file for complete search history.

(56) References Cited

U.S. PATENT DOCUMENTS

| 6,465,119 | B1* | 10/2002 | Koripella et al. | 429/32 |
| 6,497,975 | B2* | 12/2002 | Bostaph et al. | 429/38 |
| 2003/0017305 | A1* | 1/2003 | Roitman et al. | 428/156 |
| 2004/0062965 | A1* | 4/2004 | Morse et al. | 429/30 |
| 2004/0072039 | A1* | 4/2004 | Jankowski et al. | 429/19 |
| 2006/0000548 | A1* | 1/2006 | Morse et al. | 156/307.7 |

\* cited by examiner

*Primary Examiner*—Allan Olsen
(74) *Attorney, Agent, or Firm*—Alan H. Thompson; Ann M. Lee; John H. Lee

(57) ABSTRACT

Described herein is a process for fabricating microfluidic systems with embedded components in which micron-scale features are molded into the polymeric material polydimethylsiloxane (PDMS). Micromachining is used to create a mold master and the liquid precursors for PDMS are poured over the mold and allowed to cure. The PDMS is then removed form the mold and bonded to another material such as PDMS, glass, or silicon after a simple surface preparation step to form sealed microchannels.

33 Claims, 2 Drawing Sheets

US 7,186,352 B2

MICROFLUIDIC SYSTEMS WITH EMBEDDED MATERIALS AND STRUCTURES AND METHOD THEREOF

CROSS-REFERENCE TO RELATED APPLICATION

This application is a divisional of application Ser. No. 10/131,846 filed on Apr. 24, 2002 now U.S. Pat. No. 6,921,603, entitled "Microfluidic Fuel Cell Systems with Embedded Materials and Structures and Method Thereof"

The United States Government has rights in this invention pursuant to Contract No. W-7405-ENG-48 between the United States Department of Energy and the University of California for the operation of Lawrence Livermore National Laboratory.

BACKGROUND

This invention relates to fuel cells. Work is commonly derived from fuel by a combustion process which uses the pressure of expanding gases to turn a turbine or move a reciprocating piston and, ultimately, provide torque to a driveshaft. This torque is then usually used for propulsion or to generate electrical power. In the latter case, the electrical power is often times reconverted into mechanical work.

The by-products of the combustion process are waste gases, which contaminate the atmosphere or, if pollution is to be avoided or at least reduced, reacted with catalysts to produce benign compounds. The foregoing process is usually expensive and typically calls for operations and equipment that require extensive monitoring and maintenance to ensure that the emission of pollutants is kept below a prescribed maximum. Furthermore, there are energy losses inherent in the use of expanding gases to drive a turbine or piston engine due to the inefficiency of the combustion process and friction of moving parts.

SUMMARY OF THE INVENTION

One approach which avoids the foregoing disadvantages inherent to generating work by burning a fuel is the fuel cell, which produces electrical power directly from a chemical reaction which oxidizes a fuel with the aid of a catalyst. No intermediate steps, such as combustion, are needed, nor is the machinery to generate electrical power from the torque of a driveshaft. The chemical energy of the fuel is utilized much more efficiently. Since polluting waste gases are not emitted, the attendant processes and equipment required to neutralize these harmful by-products are unnecessary.

An aspect of the invention includes a process for forming a microfluidic fuel cell package. The process comprises attaching one side of a PDMS porous membrane to an MEA and bonding the other side of the PDMS porous membrane to a microfluidic molded structure. The MEA comprises an anode, an electrolyte and a cathode. The attaching is accomplished by either (1) bonding one side of the PDMS porous membrane to the MEA or (2) depositing onto one side of the PDMS porous membrane a thin film electrode/electrolyte structure.

Another aspect of the invention includes a microfluidic fuel cell system comprising: at least one fuel cell having an MEA containing an anode, anode catalyst, an electrolyte, cathode catalyst, and a cathode, the electrolyte comprising a proton exchange membrane having a thickness in the range of about 5–50 µm and operating at a temperature less than or equal to about 200° C.; a microfluidic fuel distribution structure comprising at least one microfluidic channel connecting a reservoir containing fuel to the anode, wherein the fuel is distributed to the surface area of the anode by a plurality of microfluidic fuel distribution channels; at least one resistive heating element to control the temperature of the MEA; at least one electrical isolation layer positioned above the resistive heating element; at least one feedthrough electrical connection to extract electrical power generated by the fuel cell; and a microporous anode support layer connected to the microfluidic fuel distribution channels.

DETAILED DESCRIPTION

Described herein is a process for fabricating microfluidic systems suitable for use with a variety of fuel cells that operate at temperatures up to about 200° C. These fuel cells are described in detail in pending U.S. patent application Ser. No. 09/241,159, "MEMS-based thin film fuel cells" which is hereby incorporated by reference. The microfluidic systems described herein can be arranged in series and/or in parallel and have power outputs ranging from about 100 milliWatts to about 20 Watts.

The process known as soft lithography can be used to fabricate molded structures made from the polymeric material polydimethylsiloxane (PDMS), e.g., SYLGUARD® 184 and SYLGARD® 186 made by Dow Corning Corporation of Midland, Mich. These molded PDMS structures form the basis of the microfluidic system that controls the delivery of gas or liquid fuels to the membrane electrode assembly (MEA) portion of the fuel cell package. The MEA is the electrode/electrolyte/electrode portion, including any additional components that may be sandwiched in between the two electrodes.

Micromachining or photopatterning is used to create a mold master, and the liquid precursors, e.g., liquid prepolymer mixed with a curing agent, for PDMS are poured over the mold master and allowed to cure. The curing process can comprise air drying and/or baking at temperatures up to about 120° C. The PDMS is then removed and bonded to another structure made of a material such as PDMS, glass, or silicon after a simple surface preparation step, i.e., cleaning the surface with a solvent and irradiating with an $O_2$ plasma, to form sealed microchannels. A more complex surface preparation step is needed if the PDMS is bonded to an organic material, such as, acrylic. In addition, other materials or structures may be embedded within the PDMS layers such as piezoelectric actuators, valves, fluidic connectors, silicon connectors, silicon micromachined components, and resistive heaters. A thin layer of PDMS can be formed with a high density of micropores, i.e., a porous membrane having >$10^4$ pores/$cm^2$, suitable for distributing fuel from a larger microfluidic channel having a diameter of about 50–1000 µm to an anode having a surface area of about 0.1–200 $cm^2$. In practice the diameter of the microfluidic fuel delivery channel, the density of micropores connected to this channel, and the anode surface area are closely related to the fuel flow rate for optimal performance of the fuel cell.

Figure 1:
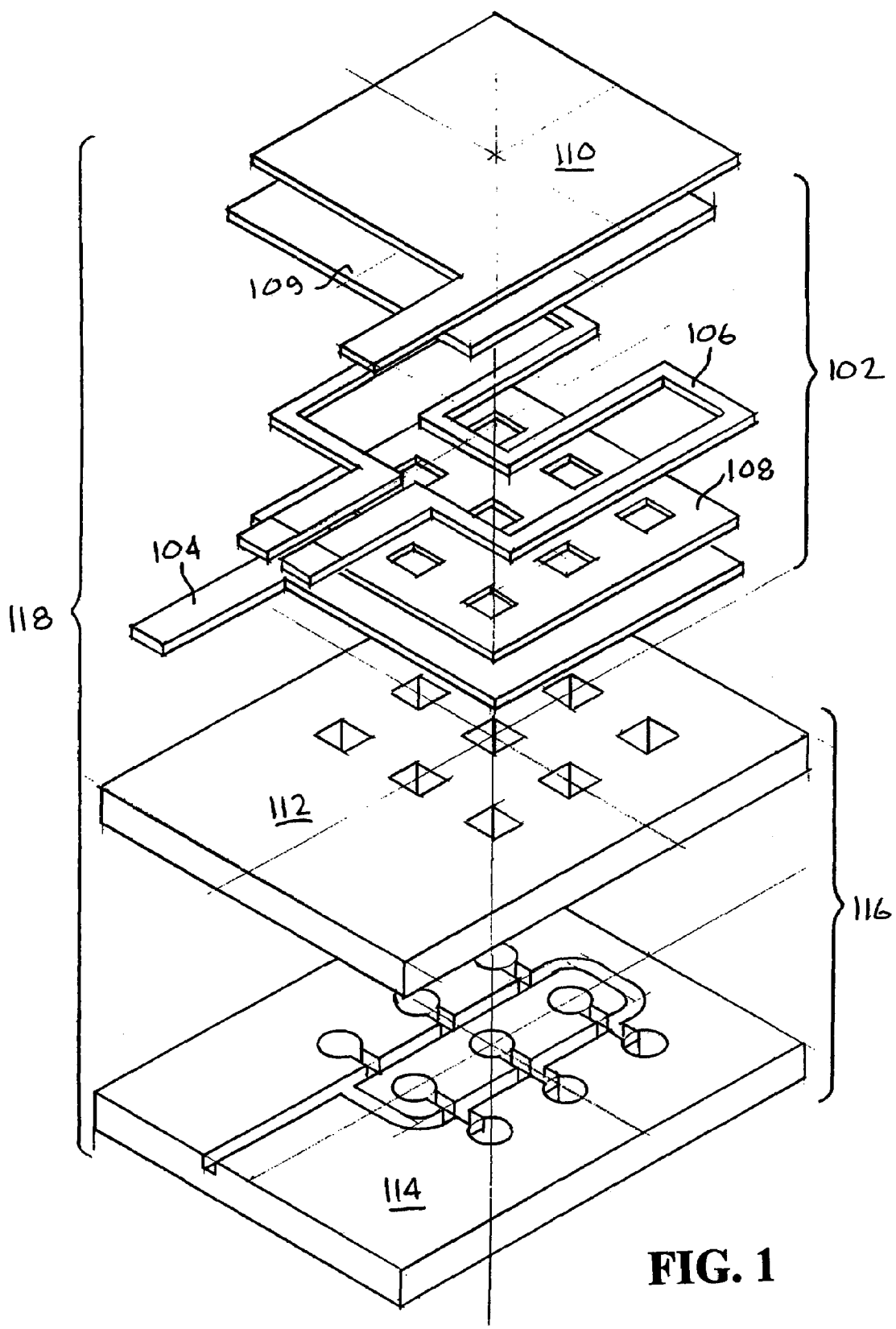
FIG. 1 is an expanded 3-dimensional layout of one embodiment of a microfluidic system.

FIG. 1 shows an expanded 3-dimensional layout of one embodiment of a microfluidic system. Referring to the embodiment shown in FIG. 1, a membrane electrode assembly (MEA) 102 comprises an anode 104, a resistive heater or a plurality of resistive heating elements 106, a heater isolation layer 108, an electrolyte 109 and a cathode 110. A micromachined manifold system 112 and a support structure 114, which together are referred to as a microfluidic fuel distribution structure 116, are formed by PDMS molding and are bonded to MEA 102 forming a sealed microfluidic fuel cell package 118. Fuel is able to flow horizontally through the manifold system and then vertically up through a porous membrane to the MEA.

The PDMS molding process is sacrificial meaning that, if necessary, the mold may be dissolved or destroyed. In practice, the mold can be designed such that the PDMS structure is pulled away from the mold. This sacrificial PDMS molding process can be used to tailor the design of fuel cell packages.

Figure 2A:
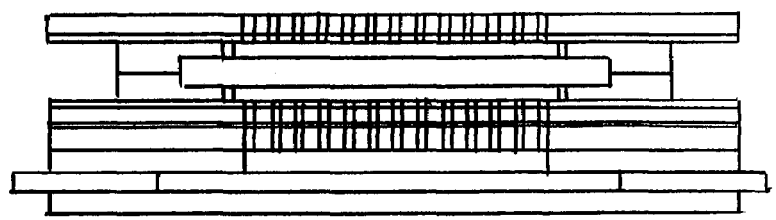
FIG. 2a is a compressed embodiment of a bonded and sealed microfluidic fuel cell package formed using a PDMS molding process.
Figure 2B:
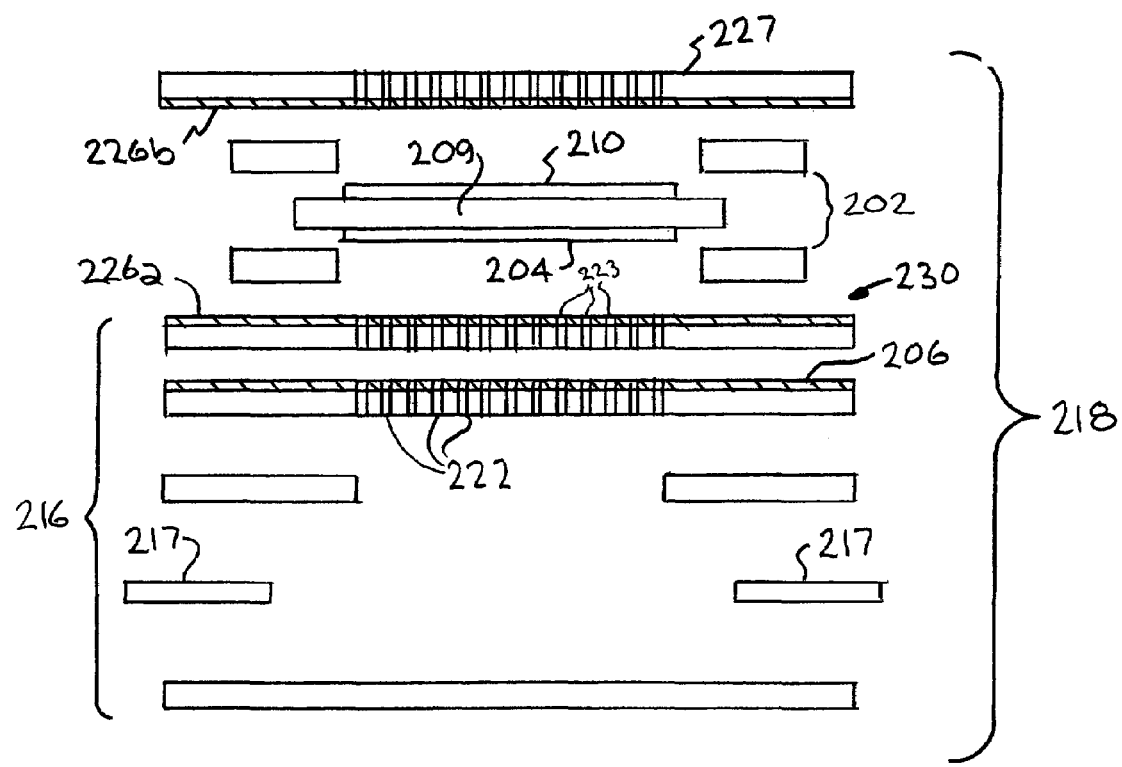
FIG. 2b is an expanded embodiment of a bonded and sealed microfluidic fuel cell package formed using a PDMS molding process.

FIG. 2 depicts another embodiment of a bonded and sealed microfluidic fuel cell package 218 formed using a PDMS molding process. Micropumps and valves (not shown) as well as isolation or turn off valves (not shown) can be incorporated into the fuel cell package to enable control of the fuel flow. PDMS can form the microfluidic fuel distribution structure 216 which contains microfluidic interconnect ferrules 217 for fuel inlet and by product outlet. A membrane electrode assembly (MEA) 202 comprising an anode 204, an electrolyte layer 209 and a cathode 210, can be formed directly on a molded or otherwise preformed host structure 230, such as, microfluidic fuel distribution structure 216. This allows connection to the microfluidic fuel distribution channels 222 through a plurality of micropores 223 covering the surface area of the anode, while allowing electrical connections, e.g., 226a, to the anode to be fed through the seal. PDMS can directly seal to a glass, silicon, or plastic substrate by surfacing bonding after appropriate surface treatments as discussed above.

PDMS provides an excellent surface for metalization. Referring to FIG. 2, metal deposition techniques (e.g., sputter, e-beam or screen printing) can be used to form embedded structures, such as, a plurality of resistive heating elements 206 for direct control of the MEA temperature, and/or a plurality of feedthrough electrical connections 226a and 226b to extract the electrical power generated. Electrical connection 226b can be sandwiched between the cathode and a PDMS air breathing electrode support structure 227.

Microfluidic fuel distribution structure 216 provides structural support for the fuel cell MEA and ideally creates a tight seal around the periphery of MEA 202. Referring to FIG. 2, fuel can be distributed to the surface area of fuel cell anode 204 through a prescribed array of holes 222 in a microfluidic channel 217 from a reservoir (not shown), with optional assistance and/or control from micropumps and valves (not shown). Selective surface treatment of the microfluidic channels or microporous anode support structure can controllably render the PDMS hydrophilic, in contrast to the natural hydrophobic state. In this manner, liquid or vapor condensed fuels will selectively be attracted to desired surfaces, such as the anode surface. Examples of surface treatments include oxygen plasma or ethanol rinse. Additionally, polymer surface coatings can also achieve the same goals. Anode 204 preferably has a large surface area, i.e, >10 $m^2$/cc to provide a high density of catalytic reactions. At anode 204, the structure is heated in the range of about 60° C. to about 90° C. to generate the electrochemical and catalytic reactions, e.g., $H_2>2H^++2e^-$ at the anode, and $4H^++2O^{-2}->2H_2O+4\ e^-$ at the cathode, which convert the fuel to electrical power. With appropriate anode catalyst materials, such as Pt—Ru, a vaporized or liquid feed of methanol-water mixture can be used. Typically, ratios of about 0–50% Ruthium/50–100% Platinum are used. In this case, the anode reaction first converts the methanol-water mixture through the reaction $CH_3OH+H_2O \rightarrow 3H_2+CO_2$, which then leads to the anode and cathode reactions as described above. An additional method of operation can use a reformate fuel feed, meaning the fuel flowing to the anode has been steam reformed from a $CH_3OH+H_2O$ mixture, therefore the byproducts $H_2+CO_2$ flow to the fuel cell anode.

A silicon master mold of a high density array of very narrow channels, i.e., about >$10^4$ channels/$cm^2$ having channels less than about 10 µm, can be created in a specific pattern. That pattern can then be transferred to the PDMS. The silicon master mold can be fabricated using deep reactive etch technology, which allows highly anisotropic structures to be created. The master mold can also be formed using a photosensitive epoxy, such as SU-8 (available through MicroChem Corporation of Newton, Mass.), which can be spin cast on a substrate such as glass or silicon, then exposed by ultraviolet light and developed to create highly anisotropic features. The pattern for the very narrow channels of the array can be thought of as "posts" on the "silicon or epoxy fence". Pre-cured PDMS can be poured over the mold, then degassed and cured to create a porous membrane. Other higher strength master molds could be formed in materials such as electroplated metals, silicon carbide or glass. A porous membrane could be formed by extrusion or injection of pre-cured PDMS over the "fence post" structure, then pulled away after an initial cure, resulting in a laminate sheet having a pattern of pores matching that of the master mold. Delicate structures in the 25–50 micron range can be created by this process. The porous membrane can then be bonded to the MEA assembly on one side. The other side is bonded to a fuel distribution system to form a complete fuel cell package.

In the alternative, thin film electrode/electrolyte structures can be deposited directly onto a porous membrane using vacuum or solgel deposition techniques. The porous membrane can then be bonded to the fuel distribution system on the other side resulting in a complete fuel cell package. Additional porous laminate layers can be used to embed one or more resistive heaters. For example, a resistive heater can be embedded directly beneath the fuel distribution microchannels and the MEA for controlling the temperature of the fuel cell.

Delicate structures in the 25 micron range can be fabricated using either a mold that can be etched away from the PDMS or a mold that is thin enough that the PDMS can be pulled away from it without tearing the structure. Approaches conducive to low cost, high throughput molding may use as the mold a preformed bed of high strength nails on either rigid or flexible substrates. The nails or pillars can be made of metal, silicon carbide, ceramic or other similar materials. The pillars may be small in diameter, but if the overall aspect ratio, i.e., height to diameter ratio, is kept small, an extruded layer of PDMS formed around the pillars can be pulled away forming a high porosity membrane. If a high aspect ratio exists, meaning the height is much greater than the diameter, the softness of the material will prevent the mold from being pulled free and a sacrificial molding process should be used.

Limitations in the silicon processing may be overcome by making the reverse of the desired pattern in the silicon mold. For example, a honeycomb structure is easier to fabricate in silicon than on an array of hexagonal posts. To make a PDMS honeycomb structure, a double-reverse molding process can be employed. PDMS molded from the silicon mold can be used as a second mold such that pre-cured PDMS can be poured onto the PDMS second mold to create a final structure nearly identical to the original silicon mold. The surface of the PDMS mold must be lightly coated with a release agent, such as, a 5% solution of micro-soap and water, so that the PDMS does not stick to itself during removal from the mold. Other techniques to form a mold will be used as deemed appropriate to achieve the goals of feature size, manufacturability, and thickness of PDMS layer.

Another approach is to use a photosensitive epoxy, such as the product SU-8. SU-8 can be spin cast onto a substrate, such as glass or silicon, in layers greater than 100 µm thick. Patterns can be transferred to the SU-8 by exposing with UV light, which crosslinks the epoxy, making it resistant to developer. The unexposed epoxy is then washed away with developer, leaving behind the exposed pattern. In this way a mold master is formed. Further coating with gold will allow the PDMS to be pulled away from the epoxy mold without destruction of either the PDMS layer or the mold structure.

High porosity membranes, i.e., >$10^5$ pores/$cm^2$ can also be formed in PDMS by first creating a thin sheet of the material through techniques, such as spin casting or extrusion, then patterning small holes in a metal or other masking patterned layer formed on the PDMS by photolithographic techniques. Etching can be accomplished using reactive ion etch techniques including $CF_4$/oxygen ion plasma etching. Small diameter pores can be achieved on the order of about 1 µm to about 25 µm if the sheet of PDMS is thin, i.e., in the range between about 10 µm and about 100 µm.

Soft lithography can be used to bond the PDMS to silicon, glass, ceramic, plastic, or other PDMS materials. However, another process is needed to bond the PDMS to organic materials that contain only carbon and hydrogen atoms, such as, acrylic. To bond to acrylic, the surfaces of the PDMS and the acrylic must first be cleaned with a solvent such as ethanol. The acrylic is then heated for approximately ten minutes at about 120° C. and placed on a plastic boat enabling it to absorb more heat. The boat and the acrylic are then placed in a beaker containing a surface bonding agent, such as Hexamethyldisilazane (HMDS), for about 1 minute. The heat from the boat evaporates the HMDS onto the surface of the acrylic providing the necessary chemistry for bonding to occur. Both the acrylic and the PDMS are plasma etched in oxygen plasma for about one minute at about 100 Watts, removed and immediately placed together. They are held firmly together for about one minute producing the desired bond.

As mentioned earlier, metalization to form resistive heating elements for direct control of the MEA temperature and feedthrough electrical connections to extract the generated electrical power from the fuel cell can also be incorporated into the fabrication process. The process of metalization onto the surface of PDMS does require some manipulation to the surface. The surface of the PDMS substrate, for example, is rinsed with a solvent such as ethanol to ensure that it is clean. The substrate can then be plasma etched in oxygen plasma at about 100 Watts for about 1 minute. An evaporation can be used to apply the metal to the surface of the plasma-etched substrate. An adhesion layer, such as titanium or chromium, is applied first at about 2 angstroms/second for about a 200-Angstrom layer. A metal layer, such as gold, is then evaporated onto the adhesion layer at about about 2 angstroms/second to obtain about a 2000-Angstrom layer. Different patterns can be formed by using a shadow mask to block the evaporation over parts of the surface. A wide variety of metals can be used for conductive wires embedded as feedthroughs to extract the electrical power from the fuel cell electrodes. The choice of metal depends on adhesion and conductivity. Typical metals used include Au, Ni, Cu, Ti, Ag, and Al. Standard photolithography techniques can also be used to pattern the metal.

Other items can also be embedded into the PDMS. For example, embedded capillary tubing can provide a leak-proof fluidic connection between the reservoir and the fuel cell package without using the normally necessary connectors that screw into the fuel cell package providing a compression seal with the tubing. Devices typically fabricated in glass or silicon could be embedded into the PDMS making fluidic connections with capillary tubing even easier without the requirement of other hardware. Examples of these devices include microfluidic systems developed in glass then embedded in a PDMS package. Capillary tubing can be embedded in the PDMS by boring holes in the cured PDMS using a hollow boring tool with a diameter slightly less than that of the tubing. Chamfering the ends of the tubing avoids damaging the hole if hard tubing such as peek is used. An aspect ratio of at least 4:1 between the length of the hole and the diameter of the tubing is preferred. Embedding the capillary tubing in this manner allows the delivery of a gaseous or liquid fuel to a microfluidic fuel cell and the distribution of air to a gas diffusion cathode structure.

Actuation can be added to the device by embedding a piezo. The piezo can be embedded by first pouring and curing a bottom PDMS layer, then covering the piezo in pre-cured PDMS to provide adhesion to the bottom layer. A second layer of PDMS was then poured over the piezo and the bottom layer, fully embedding the disk.

A suction force to manipulate beads or cells inside the channels can be added to the device by embedding micropipettes. The micropipettes could be embedded using the same process described above regarding the piezo.

Some illustrative examples follow.

EXAMPLE 1

Pre-cured PDMS is poured onto a silicon mold with the desired design etched into it, e.g., a honeycomb array 50 microns across and 50 microns high, and degassed by placing in a vacuum. The degassing ensures that air bubbles are not trapped between the PDMS and the silicon mold. The PDMS is then cured for about 4 hours at about 75° C. The mold and the attached PDMS can then be placed into about a <50% potassium hydroxide (KOH) bath to remove the silicon. The PDMS remaining will retain the pattern of the silicon.

EXAMPLE 2

An array of about 100,000 small diameter posts, i.e., <10 µm, are formed on a silicon substrate by plasma etching to a height in the range of about 20 µm to about 50 µm. The silicon is then coated with gold to act as an anti-stick layer. The PDMS is then poured over the posts and cured for about 4 hours at about 75° C. The PDMS is made thin enough so the tops of the silicon posts are exposed, i.e., <20–50 µm. After curing, the PDMS is pulled off the mold, creating a porous support structure for the fuel cell anode.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A process for forming a microfluidic fuel cell package comprising:
   attaching one side of a PDMS porous membrane to an MEA, said MEA comprising an anode, an electrolyte and a cathode, wherein said attaching is accomplished by (1) bonding one side of said PDMS porous membrane to said MEA or (2) depositing onto one side of said PDMS porous membrane a thin film electrode/electrolyte/electrode structure; and
   bonding the other side of the PDMS porous membrane to a microfluidic molded structure.

2. The process recited in claim 1, wherein the microfluidic molded structure consists essentially of silicon, PDMS, ceramic or plastic.

3. The process recited in claim 1, wherein the PDMS porous membrane is formed by a process comprising:
   extruding a sheet of PDMS with a thickness of about 25 µm to about 100 µm,
   forming a metal layer on the sheet of PDMS by photolithographic techniques,
   patterning holes in the range of about 5 µm to about 25 µm in the metal layer,
   etching using reactive ion etch techniques.

4. The process recited in claim 1, wherein said attaching of said PDMS porous membrane to said MEA is accomplished by depositing a thin film electrode/electrolyte/electrode structure onto one side of said PDMS porous membrane, wherein said depositing is accomplished by using a technique selected from the group consisting of vacuum deposition and solgel deposition.

5. The process recited in claim 1, further comprising embedding capillary tubing into the PDMS porous membrane by boring holes in the PDMS porous membrane using a hollow boring tool with a diameter slightly less than that of the tubing.

6. The process recited in claim 5, wherein the ends of the tubing are chamfered to avoid damaging the hole.

7. The process recited in claim 5, wherein the length of the tubing is about 4 times the size of the diameter of the tubing.

8. The process recited in claim 1, wherein attaching said PDMS porous membrane to said MEA is accomplished by bonding, further comprising:
   performing a surface preparation step on the surface of the microfluidic molded structure prior to bonding the PDMS porous membrane to the microfluidic molded structure.

9. The process recited in claim 8, wherein the surface preparation step comprises cleaning with a solvent and irradiating with an oxygen plasma.

10. The process recited in claim 9, wherein the solvent is ethanol.

11. The process recited in claim 1, wherein the PDMS porous membrane is formed by the process comprising:
   creating a mold master,
   pouring a PDMS liquid precursor over the mold master,
   allowing the PDMS liquid precursor to cure, and
   removing the PDMS porous membrane from the mold master.

12. The process recited in claim 11, wherein the creation of a master mold is accomplished by micromachining.

13. The process recited in claim 11, wherein the creation of a master mold is accomplished by photopatterning an epoxy.

14. The process recited in claim 11, wherein the mold master comprises silicon.

15. The process recited in claim 14, wherein removing the cured material from the mold master is accomplished by submerging the mold and the attached PDMS in an alkaline hydroxide bath to remove the silicon.

16. The process recited in claim 11, wherein the mold master comprises a photoresist.

17. The process recited in claim 16, wherein removing the cured material from the mold master is released by submerging the mold and the attached PDMS in an acetone bath to remove the photoresist.

18. The process recited in claim 1, wherein attaching said PDMS porous membrane to said MEA is accomplished by bonding, said process further comprising:
   forming at least one embedded metal structure onto the surface of one side of the PDMS porous membrane before bonding that side to the microfluidic molded structure.

19. The process recited in claim 18, wherein forming the embedded metal structure comprises:
   rinsing the surface of the PDMS material with a solvent,
   plasma etching the surface of the PDMS material in $O_2$ plasma to form a plasma-etched substrate,
   forming an adhesion layer onto the surface of the plasma-etched substrate,
   evaporating a metal layer onto the adhesion layer,
   patterning the metal layer.

20. The process recited in claim 19, wherein the patterning of the metal layer is accomplished by using a shadow mask.

21. The process recited in claim 19, wherein the patterning of the metal layer is accomplished by photolithography techniques.

22. The process recited in claim 19, wherein the embedded metal structure is a resistive heating element.

23. The process recited in claim 19, wherein the embedded metal structure is a feedthrough electrical interconnect.

24. The process recited in claim 19, wherein the adhesion layer is chromium.

25. The process recited in claim 19, wherein the adhesion layer is applied to a thickness of about 200-Å.

26. The process recited in claim 19, wherein the metal layer is selected from the group consisting of gold, nickel, copper, titanium, aluminum and silver.

27. The process recited in claim 19, wherein the metal layer is applied to a thickness of about 2,000-Å.

28. The process recited in claim 1, wherein the microfluidic molded structure comprises an organic material.

29. The process recited in claim 28, wherein the organic material is acrylic.

30. The process recited in claim 28, wherein attaching said PDMS porous membrane to said MEA is accomplished by bonding, wherein said bonding of the PDMS porous membrane to the microfluidic molded structure comprises:
   (g) cleaning both the surface of PDMS porous membrane and the surface of the organic material with a solvent,
   (h) heating the organic material,
   (i) placing the organic material in a boat comprising a material that allows the organic material to absorb heat,
   (j) submerging the organic material in a surface bonding agent,
   (k) plasma etching both the organic material and the PDMS porous membrane in $O_2$ plasma, and (l) placing together the PDMS porous membrane and the organic material immediately following step (k).

31. The process recited in claim 30, wherein the bonding of the cured material to the microfluidic molded structure comprises:

cleaning both the surface of the PDMS porous membrane and the surface of the organic material with a solvent, heating the organic material to about 120° C. for about 10 minutes, placing the organic material in a boat comprising a material that allows the organic material to absorb heat, submerging the organic material in a surface bonding agent for about 1 minute, plasma etching both the organic material and the PDMS porous membrane in $O_2$ plasma for about 1 minute at about 100 Watts, and placing together the PDMS porous membrane and the organic material immediately following the etching step.

32. The process recited in claim 31, wherein the solvent is ethanol.

33. The process recited in claim 31, wherein the boat comprises plastic.

* * * * *